US000001839H

United States Statutory Invention Registration [19]

[11] Reg. Number: H1,839

Combes et al. [45] Published: Feb. 1, 2000

[54] SUPERCRITICAL FLUID PROCESSES

[75] Inventors: James R. Combes, Burlington, Canada; Samir Kumar, Rochester; Lewis S. Smith, Fairport, both of N.Y.; Hadi K. Mahabadi, Etobicoke; Peter G. Odell, Mississauga, both of Canada

[73] Assignee: Xerox Corporation, Stamford, Conn.

[21] Appl. No.: 08/839,273

[22] Filed: Apr. 17, 1997

[51] Int. Cl.[7] ..... C08F 6/00

[52] U.S. Cl. ..... 528/483; 528/501; 528/502 E; 264/5; 264/12; 430/109; 430/137

[58] Field of Search ..... 528/483, 501, 528/502 E; 264/5, 12; 430/109, 137

[56] References Cited

U.S. PATENT DOCUMENTS

| | | | |
|---|---|---|---|
| 4,734,451 | 3/1988 | Smith | 264/12 X |
| 5,312,882 | 5/1994 | DeSimone et al. | 526/201 |
| 5,382,623 | 1/1995 | DeSimone et al. | 524/557 |
| 5,451,633 | 9/1995 | DeSimone et al. | 524/731 |
| 5,506,317 | 4/1996 | DeSimone et al. | 525/201 |

OTHER PUBLICATIONS

D.W. Matson et al., "Rapid Expansion of supercritical Fluid Solutions: Solute Formation of Powders, Thin Films, and Fibers", *Ind. Eng. Chem. Res.*, 1987, vol. 26, No. 11, pp. 2298–2306.

S. Mawson et al., "Formation of Poly(1,1,2,2–tetrahydroperfluorodecyl acrylate) Submicron Fibers and Particles from Supercritical Carbon Dioxide Solutions", *Macromolecules*, 1995, vol. 28, No. 9, pp. 3182–3191.

CAPLUS Abstract 1997:517308 of dissertation by Gregory Griscik entitled "Wax Particle Formation from . . . Supercritical Solutions," Georgia Inst. of Tech., Atlanta, GA, USA, 1996.

*Primary Examiner*—Peter A. Nelson
*Attorney, Agent, or Firm*—Eugene O. Palazzo

[57] ABSTRACT

A process for the preparation of toner additive wax particles which comprises the micronization of said particles from a supercritical solution.

21 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SUPERCRITICAL FLUID PROCESSES

BACKGROUND OF THE INVENTION

This invention is generally directed to processes, and more specifically, the present invention relates to processes for the preparation of small, and submicron particles, for example wherein small is from about 0.001 to about 4 microns, or submicron of from about 0.05 to about 1.0 micron in average particle diameter, wherein undesirable solvents can be avoided, and wherein a supercritical fluid or compressed liquid, such as carbon dioxide, ethane, propane, butane, isobutane, pentane, chlorodifluoromethane or trifluoromethane is selected as the solvent. The present invention in embodiments relates to a process for the preparation of submicron particles, such as toner wax particles, which comprises the micronization and spraying of these particles from a supercritical solution. Of importance with respect to the present invention is the generation of dry wax particles comprised of small, or submicron ultrafine particle sizes and which particles are not believed to be presently available. The particles obtained, such as the waxes, can be selected as additives for toners of resin and pigment, and wherein the toners can be selected for xerographic imaging and printing processes, including digital processes. The waxes are known, for example 660P available from Sanyo Chemicals of Japan.

PRIOR ART

The use of supercritical carbon dioxide for the synthesis of certain polymers like poly(methyl methacrylate) is disclosed, for example, in U.S. Pat. Nos. 5,312,882; 5,382,623; 5,506,317 and 5,451,633, the disclosures of each of these patents being totally incorporated herein by reference.

Also known for the preparation of certain materials is the precipitation with a compressed antisolvent (PCA), and Rapid Expansion of a Supercritical Solution (RESS). RESS involves the expansion of a supercritical solution of the polymer to be granulated through a narrow orifice. RESS can be selected for the preparation of fibers of polystyrene, poly(methyl methacrylate) , and certain fluoropolymers. In Matson et al. (*Ind. Eng. Chem. Res.* 1987, 26, 2298), there is illustrated the use of RESS for several metal oxides including $SiO_2$, $GeO_2$-$H_2O$ and $ZrO(NO_3)_2$-ethanol. For these materials, supercritical water was necessary at temperatures ranging from about 350° C. to about 475° C. Matson et al. also demonstrates that SCF pentane can be selected for the preparation of polystyrene spheres and fibers.

Mawson et al. (*Macromolecules,* 1995, 28, 3182) demonstrates similar process viability for RESS in producing spherical and certain fluoropolymer particles from SCF carbon dioxide. Few polymers are soluble in carbon dioxide, and are, therefore, not suitable for RESS in carbon dioxide. However, many fluoropolymers, including, poly(1,1,2,2-tetrahydroperfluorodecylacrylate), and silicones exhibit substantive solubility.

U.S. Pat. No. 4,734,227 illustrates RESS to provide micronized polyimide material for thin powder coatings. Additionally, the use of a secondary supercritical solvent allows for the production of long thin fibers of nylons or polyesters.

U.S. Pat. No. 4,970,093 describes a process in which RESS is used to produce an aerosol such that a reaction between the precipitated material and the expanding solvent transpires to form a surface adhering film.

U.S. Pat. No. 5,412,027 describes a process in which metastable polymeric alloys are formed by the codissolution of the otherwise immiscible polymers in a supercritical solution. This solution can then be expanded in a RESS method.

Laboratory demonstrations of the RESS process, however, employ high pressure rated vessels with the solution therein containing a resin like a polyimide. As supercritical conditions are generally at higher temperatures than for liquid solutions, a large amount of heat must be applied to the vessel to maintain the solution at supercritical conditions.

An additional difficulty is that, unless the material to be granulated can be fed to the vessel continuously under pressure, the solution conditions change as the expansion across the nozzle depletes the material inside. If the process is operated at a constant pressure mode via the continuous addition of solvent, the mole fraction of the material being granulated diminishes and a broader size dispersity of the precipitating material results. When the process is operated in a batch mode without any addition, the pressure decreases as material exits the reactor. This change in pressure can cause premature precipitation of the material being granulated inside the vessel, and the orifice can plug as a result.

When, however, the material being granulated is dissolved in a pressurized liquid solution with negligible solubility in the vapor phase, and if it is this liquid phase being fed to the housing containing the RESS expansion nozzle, then a constant mole fraction solution can be processed and a narrower size dispersity of the precipitated product can be realized. Additionally, the energy savings of heating the expansion nozzle alone to above the critical temperature and not the entire vessel can be substantial.

Particulate materials are of importance for xerographic inks, and dry toner particles comprised of resin, pigment, charge control additive, external surface additives and sometimes a polymeric wax. Wax addition is needed primarily to ensure the release of the fused toner image from the surface of the fuser roll. Fusing is the final step of the xerographic process and involves intimate contact between the fuser and the toner residing as a latent image on the paper's surface. The heat of the fuser and the shear imparted to the toner by the fuser causes the latent image of the toner to fuse to the paper. One difficulty with this process that arises is adhesion of the toner to the fuser and not the paper, a phenomenon known as hot offset.

The dispersion of wax inside a toner particle facilitates the release of toner from the fuser. Upon fusing of the latent toner image, both shear forces and temperature gradients are imparted to the toner. The dispersed wax, being interfacially active, flows to reside preferentially between the surface of the toner and fuser. As the surface energy of wax is lower than the toner resin, release of the toner from the fuser is facilitated and hot offset is mitigated.

Many waxes, however, are not thermodynamically miscible with toner resins. Therefore, the dispersion of wax is not uniform throughout an individual toner particle, nor is the weight fraction of wax in the toner uniformly distributed among the toner particles. Therefore, a greater propensity exists for hot offset amongst the particles that contain little or no wax.

To ensure more uniform dispersion of wax in substantially all of the toner particles, compatibilizers are often used. Typical compatibilizers are block or graft copolymers, and their primary function is to promote the thermodynamic miscibility of wax domains in the toner resin and thereby ensure the uniform distribution and function of wax with the toner particles.

One drawback to the use of compatibilizer, however, is that the propensity of the wax to flow to the interfacial area is reduced. The utility of the wax in toner is diminished as compatibilizer, by promoting miscibility, inhibits its flow to the interfacial region during fusing.

One potential solution to the problem of wax in toner distribution and function would be to have the wax dispersed in minute particulate form on the surface of each toner particle. Such a process would ensure a relatively uniform mass distribution of wax on the toner, and provide a means for having the wax available in the interfacial region for fusing. Also, such a process can lower the overall amount of wax needed, and eliminate the need for additional compatibilizer in toner. These and other disadvantages are eliminated, or minimized with the processes of the present invention in embodiments thereof.

SUMMARY OF THE INVENTION

It is an object of the present invention to provide processes with many of the advantages illustrated herein.

Another object of the present invention resides in the provision of simple processes for the preparation of submicron toner additives.

It is a further object of the invention to provide processes for the preparation of waxes, especially low molecular weight waxes, that is for example with a number average molecular weight of from about 500 to about 20,000, and preferably from about 1,000 to about 10,000.

In embodiments, the present invention relates to the provision of processes for the preparation of small, or submicron wax particles utilizing supercritical or compressed liquid carbon dioxide, ethane, propane, trifluoromethane, and the like as the solvent. Embodiments of the present invention include a process for the preparation of small size wax particles, which comprises the micronization of the particles from a supercritical solvent, and the particles generated are comprised of a wax; wherein the wax is, for example, polypropylene, or polyethylene; wherein the micronization is accomplished by spraying the particles with the supercritical solvent through an orifice; wherein subsequent to the micronization the particles are isolated and are of a size diameter of from about 0.001 to about 4, or from about 0.001 to about 1.0 micron in volume average diameter; and wherein the process is accomplished, for example, at a pressure of from about 600 to about 5,000 pounds per square inch and at a temperature of from about 30° C. to about 200° C. (Centigrade).

The process in embodiments is initiated with a loading of the polypropylene or polyethylene toner wax into a high pressure vessel in an amount ranging from 0.001 to about 50 weight/volume percent, or from about 0.001 to about 50 grams per 100 milliliters of reactor volume. The vessel is subsequently sealed. The vessel is then heated to the desired temperature, ranging, for example, from about 30° C. to about 500° C., with preferred temperatures being from about 50° C. to about 150° C. Upon achieving the desired temperature, the fluid solvent, for example $CO_2$, $C_2H_6$, $C_3H_8$, $CHClF_2$, $C_4H_{10}$, iso-$C_4H_{10}$, $C_5H_{12}$ or $CHF_3$, is then added to the vessel to yield a solution density ranging from about 0.5 to about 2.5 grams/milliliter. Pressures generated can range from about 30 bar to about 800 bar.

After the wax/material to be precipitated has dissolved, it is applied to the expansion chamber sufficient to maintain the temperature at or above the critical temperature of the solution being fed, for example from about 30° C. to about 500° C. A valve from the source of the solvent that is at a higher, for example from about 35 to about 805 bar, pressure than the vessel pressure is then opened to initiate fluid flow through the precipitation orifice. Upon establishment of a steady flow pattern, a valve V1 to the vessel is opened and valve V2 is subsequently closed. This pressurization of the expansion chamber prior to flow from the pressure vessel is selected primarily to prevent precipitation of wax upstream of the expansion nozzle and subsequent plugging of the orifice. The precipitated wax product is then collected via a downstream filtration device.

Embodiments of the present invention include: A process for the preparation of toner additive wax particles, which comprises the micronization of the wax particles from a supercritical solution; a process wherein the wax particles obtained are from about 0.001 to about 4 microns in volume average diameter; a process wherein the wax particles are inserted into and sealed in a high pressure vessel at a loading of from about 0.001 to about 50 weight/volume percent, or from about 0.001 to about 50 grams per 100 milliliters of vessel volume; the vessel is subsequently heated to from about 30° C. to about 400° C. and then filled with a supercritical solution; the vessel is then agitated; the resulting solution is subsequently expanded across an orifice of, for example, from 5 to 100 microns in diameter, and which orifice has been heated to a temperature higher than the critical temperature of the solution, and which temperature is, for example, from about 50° C. to about 450° C.; and thereafter the resulting precipitating wax is separated from the expanding gas stream; a process wherein the supercritical fluid is carbon dioxide; a process wherein the supercritical solution, or solvent is carbon dioxide, ethane, propane, butane, isobutane, pentane, chlorodifluoromethane or trifluoromethane; a process wherein the wax is polypropylene, or polyethylene; a process wherein the wax is polypropylene, or polyethylene, each with a $M_w$ of from about 500 to about 20,000 Dalton and an $M_n$ of from about 250 to about 10,000 Dalton; a process wherein the micronization is accomplished by rapid expansion of the supercritical solution, thereby generating the wax particles from the supercritical solution; a process wherein, subsequent to the micronization, the particles are isolated and are of a small size of from about 0.001 to about 4.0 microns in volume average diameter; a process wherein the process is accomplished at a pressure of from about 40 bar to about 850, or from about 75 to about 500 bar, and at a temperature of from about 30°C. to about 500°C.; a process wherein the supercritical solution is comprised of a carbon dioxide fluid and which carbon dioxide is at a temperature of above about 31° C. and a pressure of about 71 bar to 232 bar; a process wherein there is formed a supercritical phase at above the critical temperature of about 31° C. and above the critical pressure of about 71 bar to about 232 bar; a process wherein the polypropylene is of a low molecular weight with an $M_w$ of from about 1,000 to about 25,000 and an $M_n$ of from about 500 to about 12,000; a process wherein the polyethylene is of a low molecular weight with an $M_w$ of from about 1,000 to about 25,000 and an $M_n$ of from about 500 to about 12,000; a process wherein the polypropylene is of a low molecular weight of from about 500 to about 10,000 number average; and wherein the polyethylene is of a low molecular weight of from about 700 to about 2,000 number average; a process for the preparation of wax with a small diameter size, which process comprises inserting and sealing the wax in a high pressure vessel at a loading of from 0.001 to 50 weight/volume percent, or from about 0.001 to about 50 grams per 100 milliliters of vessel volume, the vessel being subsequently heated to from about 30°C. to about 400°C., and which vessel contains a solvent of carbon dioxide, ethane, propane, butane, isobutane, pentane, chlorodifluoromethane or trifluoromethane, sufficient to yield an average density of from 0.7 to 1.5 grams/cc in the vessel; the vessel is then agitated for from about 1 to about 60 minutes to dissolve the wax; the solution from the lower or liquid phase of the vessel is then expanded across an orifice in the expansion chamber of from 5 to 100 microns in diameter, and which chamber is retained at a temperature above the critical temperature of the solution, which temperature is from about 40° C. to about 510° C., thereby ensuring that the expansion is from said supercritical solution; and separating the resulting precipitating wax from the expanding gas stream; a process wherein small is from about 0.001 to about 4 microns, or from about 0.01 to about 3 microns; a process wherein small is submicron in size; a process wherein submicron is from about 0.001 to about 1 micron; a process wherein the supercritical solution or solvent is carbon dioxide, ethane, propane, butane, isobutane, pentane, chlorodifluoromethane or trifluoromethane, wherein the reaction vessel agitation is for from about 1 to about 60 minutes thereby dissolving the wax, and wherein the separating from the expanding gas is by filtration; and a process which comprises the micronization of wax particles from a supercritical solution.

Embodiments of the invention will be illustrated in the following nonlimiting Examples, it being understood that these Examples are intended to be illustrative only, and that the invention is not intended to be limited to the materials, conditions, process parameters and the like recited.

EXAMPLE I

In a 100 milliliter reactor, 50 milligrams of a polypropylene wax is placed and sealed inside. The reactor is subsequently heated to 300° C. After achieving this temperature, 90 grams of pentane are added via a high pressure liquid pump. The system is then agitated for 30 minutes to allow for the polypropylene dissolution.

Heating is then applied to an RESS expansion nozzle (30 μm diameter) to bring it and the entire expansion chamber to 400° C.

Subsequent to this heating, a high pressure source of pure pentane (from, for example, a high pressure liquid pump operating at, for example, 60 bar) is directed into the expansion chamber. After an established flow of this solvent through the nozzle transpired, the valve to the reactor is opened, followed by the closing of the valve to the pentane solvent source.

The precipitating polypropylene is separated from the stream of pentane vapor by a downstream filtration device. The particle size of from 0.01 to 5.0 microns, and the particle size distribution of from 1.0 to 9.0 of the precipitated polypropylene can be measured with a known laser light scattering technique.

EXAMPLE II

The process of Example I is repeated with the exception that there is selected as the solvent propane instead of pentane, and it is believed that substantially similar results are obtainable.

EXAMPLE III

The process of Example I is repeated with the exception that there is selected as the solvent isobutane instead of pentane, and it is believed that substantially similar results are obtainable.

EXAMPLE IV

The process of Example I is repeated with the exception that there is selected as the solvent butane instead of pentane, and it is believed that substantially similar results are obtainable.

EXAMPLE V

The process of Example I is repeated with the exception that there is selected as the solvent supercritical fluid carbon dioxide instead of pentane, and it is believed that substantially similar results are obtainable.

EXAMPLE VI

The process of Example I is repeated with the exception that there is selected as the solvent chlorodifluoromethane instead of pentane, and it is believed that substantially similar results are obtainable.

EXAMPLE VII

The process of Example I is repeated with the exception that there is selected as the solvent ethane instead of pentane, and it is believed that substantially similar results are obtainable.

EXAMPLE VIII

The process of Example I is repeated with the exception that there is selected as the solvent ethane instead of pentane, and it is believed that substantially similar results are obtainable.

EXAMPLE IX

The process of Example I is repeated with the exception that there is selected polyethylene instead of polypropylene, and it is believed that substantially similar results are obtainable.

EXAMPLE X

The process of Example I is repeated with the exception that there is selected propane at 150° C. instead of pentane at 300° C. The expansion chamber is also at 200° C., not 400°C. as in Example I. It is believed that substantially similar results would be obtainable.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A process for the preparation of toner additive wax particles which comprises the micronization of said particles from a supercritical solution.

2. A process in accordance with claim 1 wherein said particles are from about 0.001 to about 4 microns in volume average diameter.

3. A process in accordance with claim 1 wherein the wax particles are inserted into and sealed in a pressure vessel at a loading of from about 0.001 to about 50 weight/volume percent, or from about 0.001 to about 50 grams per 100 milliliters of vessel volume; the vessel is subsequently heated to from about 30°C. to about 400° C. and filled with said supercritical solution; the vessel is then agitated; the resulting solution is subsequently expanded across an orifice of from 5 to 100 microns in diameter that has been heated to a temperature higher than the critical temperature of the solution and which temperature is from about 50° C. to about 450° C.; and thereafter the resulting precipitating wax is separated from the expanding gas stream.

4. A process in a accordance with claim 3 wherein the supercritical fluid is carbon dioxide.

5. A process in accordance with claim 1 wherein the supercritical solution, or solvent is carbon dioxide, ethane, propane, butane, isobutane, pentane, chlorodifluoromethane or trifluoromethane.

6. A process in accordance with claim 1 wherein the wax is polypropylene, or polyethylene.

7. A process in accordance with claim 1 wherein the wax is polypropylene, or polyethylene, each with an $M_w$ of from about 500 to about 20,000 Dalton and an $M_n$ of from about 250 to about 10,000 Dalton.

8. A process in accordance with claim 1 wherein said micronization is accomplished by rapid expansion of said supercritical solution, thereby generating said wax particles from said supercritical solution.

9. A process in accordance with claim 1 wherein, subsequent to said micronization, the particles are isolated and are of a size of from about 0.001 to about 4.0 microns in volume average diameter.

10. A process in accordance with claim 1 wherein the process is accomplished at a pressure of from about 40 bar to about 850 bar, and at a temperature of from about 30° C. to about 500° C.

11. A process in accordance with claim 1 wherein the supercritical solution is comprised of a carbon dioxide fluid, and which carbon dioxide is at a temperature of above about 31° C. and a pressure of about 71 bar to about 232 bar.

12. A process in accordance with claim 11 wherein there is formed a supercritical phase at above the critical temperature of about 31° C. and above the critical pressure of about 71 bar to about 232 bar.

13. A process in accordance with claim 6 wherein said polypropylene is of a low molecular weight with an $M_w$ of from about 1,000 to about 25,000, and an Mn of from about 500 to about 12,000.

14. A process in accordance with claim 6 wherein said polyethylene is of a low molecular weight with an $M_w$ of from about 1,000 to about 25,000, and an $M_n$ of from about 500 to about 12,000.

15. A process in accordance with claim 6 wherein said polypropylene is of a low molecular weight of from about 500 to about 10,000 number average; and wherein said polyethylene is of a low molecular weight of from about 700 to about 2,000 number average.

16. A process for the preparation of wax, which process comprises inserting and sealing the wax in a pressure vessel at a loading of from about 0.001 to about 50 weight/volume percent, or from about 0.001 to about 50 grams per 100 milliliters of vessel volume, the vessel being subsequently heated to from about 30° C. to about 400° C., and which vessel contains a solvent of carbon dioxide, ethane, propane, butane, isobutane, pentane, chlorodifluoromethane or trifluoromethane sufficient to yield an average density of from about 0.7 to about 1.5 grams/cc in the vessel; the vessel is then agitated for from about 1 to about 60 minutes to dissolve the wax; the solution from the lower or liquid phase of the vessel is then expanded across an orifice in the expansion chamber of from 5 to 100 microns in diameter and which chamber is retained at a temperature above the critical temperature of the solution, which temperature is from about 40° C. to about 510° C., thereby ensuring that the expansion is from said supercritical solution; and separating the resulting precipitating wax from the expanding gas stream.

17. A process in accordance with claim 16 wherein said wax is of a diameter of from about 0.001 to about 4 microns.

18. A process in accordance with claim 16 wherein said wax is of a diameter of is submicron in size.

19. A process in accordance with claim 18 wherein submicron is from about 0.001 to about 1 micron.

20. A process in accordance with claim 3 wherein said supercritical solution or solvent is carbon dioxide, ethane, propane, butane, isobutane, pentane, chlorodifluoromethane or trifluoromethane, wherein said vessel agitation is for from about 1 to about 60 minutes thereby dissolving the wax, and wherein said separating from said expanding gas is by filtration.

21. A process which comprises the micronization of wax particles from a supercritical solution.

* * * * *